United States Patent
Kiernan et al.

(10) Patent No.: US 8,241,596 B2
(45) Date of Patent: Aug. 14, 2012

(54) HIGH-EFFICIENCY, HOT TRAP APPARATUS AND METHOD

(75) Inventors: Jeffrey D. Kiernan, Frederick, CO (US); Matthew C. Grout, Blackhawk, CO (US); Kevin Grout, Denver, CO (US)

(73) Assignee: MKS Instruments, Inc., Andover, MA (US)

( * ) Notice: Subject to any disclaimer, the term of this patent is extended or adjusted under 35 U.S.C. 154(b) by 55 days.

(21) Appl. No.: 12/983,162

(22) Filed: Dec. 31, 2010

(65) Prior Publication Data
US 2012/0171092 A1   Jul. 5, 2012

(51) Int. Cl.
*B01D 53/34* (2006.01)
*B01D 53/64* (2006.01)
*B01D 53/74* (2006.01)

(52) U.S. Cl. .................. 423/210; 422/168; 422/177

(58) Field of Classification Search .................. 423/210; 422/168, 177
See application file for complete search history.

(56) References Cited

U.S. PATENT DOCUMENTS

| | | | | |
|---|---|---|---|---|
| 5,417,934 A * | 5/1995 | Smith et al. | .................. | 422/177 |
| 6,833,024 B2 * | 12/2004 | Holst et al. | ...................... | 96/108 |
| 7,871,587 B2 * | 1/2011 | Gu et al. | ........................ | 423/210 |
| 2009/0191109 A1 * | 7/2009 | Tsuda | ........................ | 423/240 R |

* cited by examiner

*Primary Examiner* — Timothy Vanoy
(74) *Attorney, Agent, or Firm* — James R. Young; Cochran Freund & Young LLC (57) ABSTRACT

A hot trap for removing a reactive constituent gas from a gas stream via chemical reaction and/or thermal disassociation includes a trap chamber with a heater assembly and a trap medium in its core inner portion and annular pre-heating and counterflow heating ducts in its outer and intermediate portions surrounding the core inner portion for heating an inflowing gas stream and conservation of heat energy in the trap as well as to maintain lower temperatures on external surfaces.

18 Claims, 10 Drawing Sheets

HIGH-EFFICIENCY, HOT TRAP APPARATUS AND METHOD

TECHNICAL FIELD

The present invention is related to hot traps for removing a reactive constituent gas from a gas stream via chemical reaction and/or thermal disassociation.

BACKGROUND

In vacuum processes for depositing thin films of material on substrates, such as a wafers, in a vacuum, for example in chemical vapor deposition processes, atomic layer deposition processes, and the like, the effluent gas flows from the vacuum processing chamber may be undesirable for any or a number of reasons. For example, some of such effluent gases are toxic, some are environmental pollutants, and some are problematic in the downstream equipment, such as vacuum pumps and forelines. Therefore, it is often desirable to remove such problematic effluent gases in some manner from the effluent gas streams. A variety of traps for removing various kinds of gases from effluent gas streams are available commercially, and some of them are specifically designed specifically for removal of particular elements or compounds from effluent gas streams. For example, traps for removing condensable gaseous materials from an effluent gas stream have included means for lowering temperature of the effluent gas in large volume chambers to facilitate condensation and collection of solid or liquid condensate without clogging the chambers, whereas traps for removing gaseous materials by chemical reactions or thermal dissociation may include means, for example heating devices, to heat and increase temperatures of the gaseous materials in a chamber to promote a reaction.

The foregoing examples of related art and limitations related therewith are intended to be illustrative and not exclusive, and they do not imply any limitations on the inventions described herein. Other limitations of the related art will become apparent to those skilled in the art upon a reading and understanding of the specification and of the drawings.

BRIEF DESCRIPTION OF THE DRAWINGS

The accompanying drawings, which are incorporated herein and form a part of the specification, illustrate some, but not the only or exclusive, example embodiments and/or features. It is intended that the embodiments and figures disclosed herein are to be considered illustrative rather than limiting.

In the drawings.

DETAILED DESCRIPTION OF EXAMPLE IMPLEMENTATIONS

Figure 1:
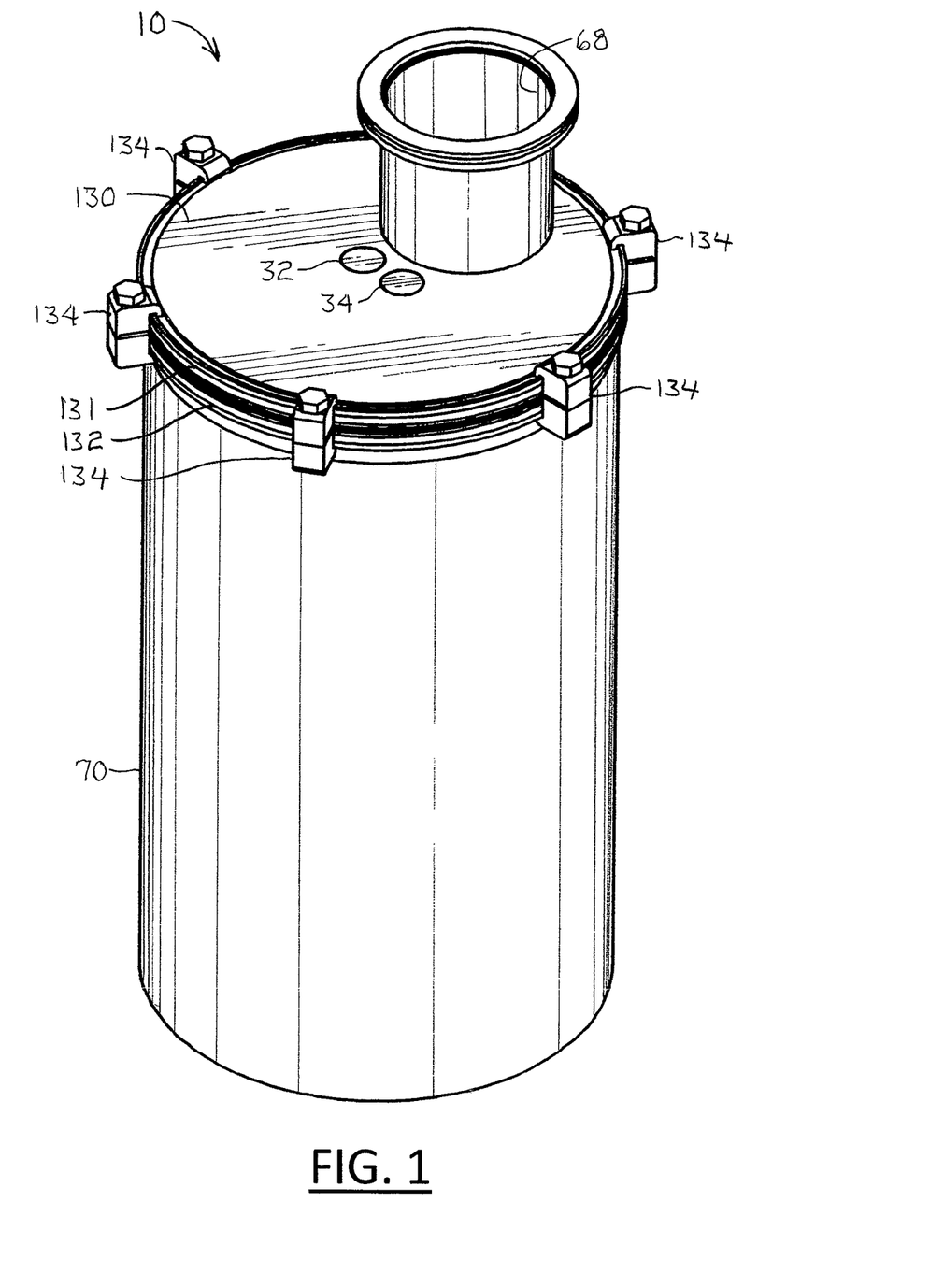
FIG. 1 is an isometric view of an example high-efficiency, hot trap.
Figure 2:
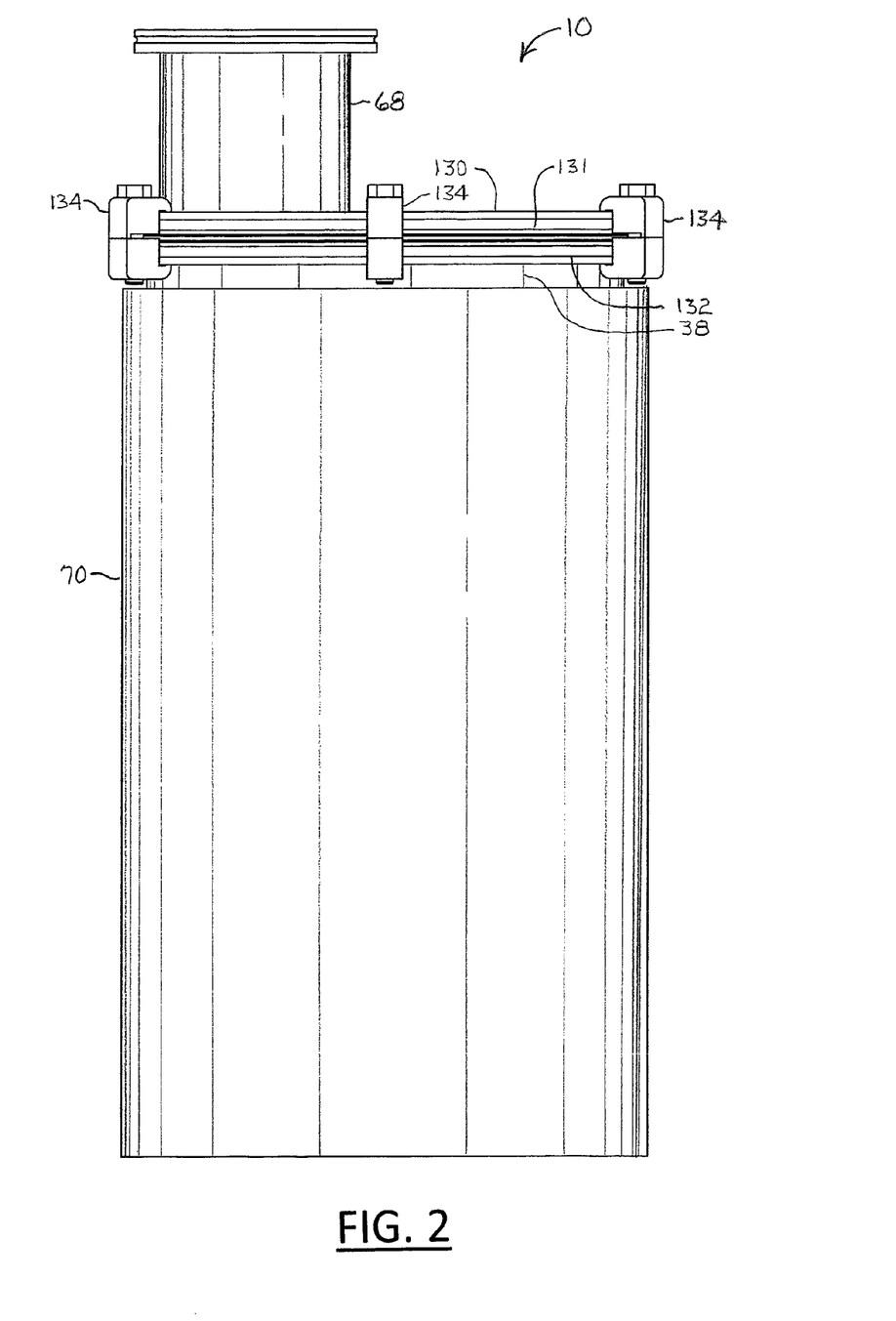
FIG. 2 is side elevation view of the example high-efficiency, hot trap in FIG. 1.
Figure 3:
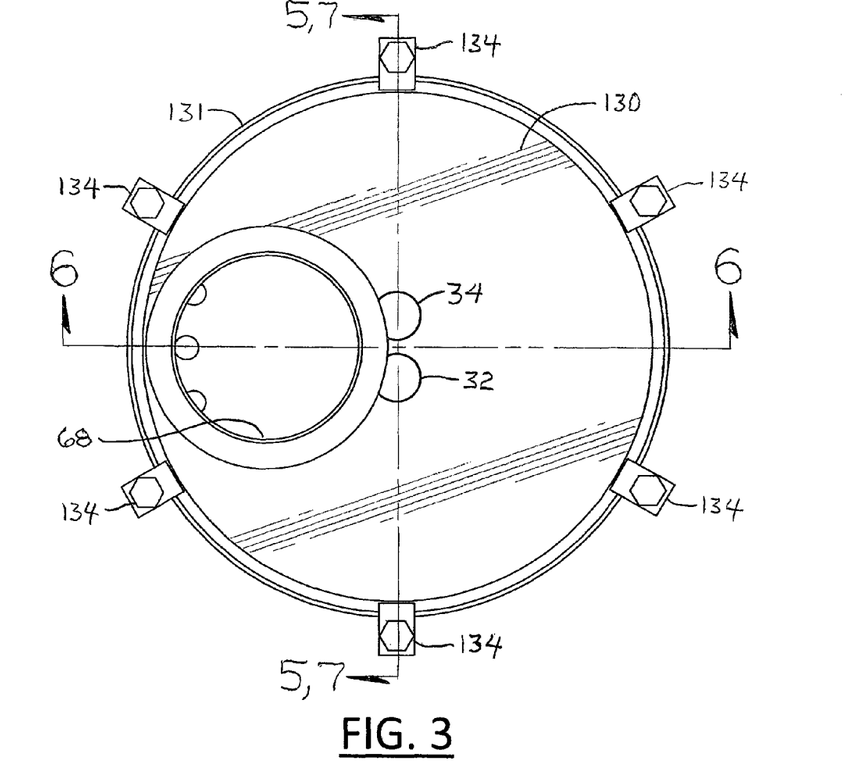
FIG. 3 is a top elevation view of the example high-efficiency, hot trap of FIG. 1.

An example high-efficiency, hot trap 10 shown in FIGS. 1-3 can be used for reacting or dissociating and thereby removing a variety of gaseous substances from a gaseous effluent stream in which heat applied to the gaseous substances promotes gas or surface reactions in a trap chamber. This example high-efficiency, hot trap 10 is particularly effective for removal of nickel (Ni) from effluents of reaction chambers, for example, the reaction chamber 12 shown diagrammatically in FIG. 4, in which a thin film 14 of elemental Ni is deposited on a substrate 16. Very high temperatures, for example, in excess of 400° C., can be applied in the hot trap 10 to the gaseous effluent in a trap medium with a high surface area to react or dissociate a Ni-containing precursor to deposit the Ni from the precursor in the trap chamber in a very energy-efficient manner that not only removes a very high percentage of the Ni in the effluent gas stream, but also in a manner that conserves heat and minimizes risk of burns to personnel who might come into contact with the trap 10, as will be explained in more detail below.

Figure 4:
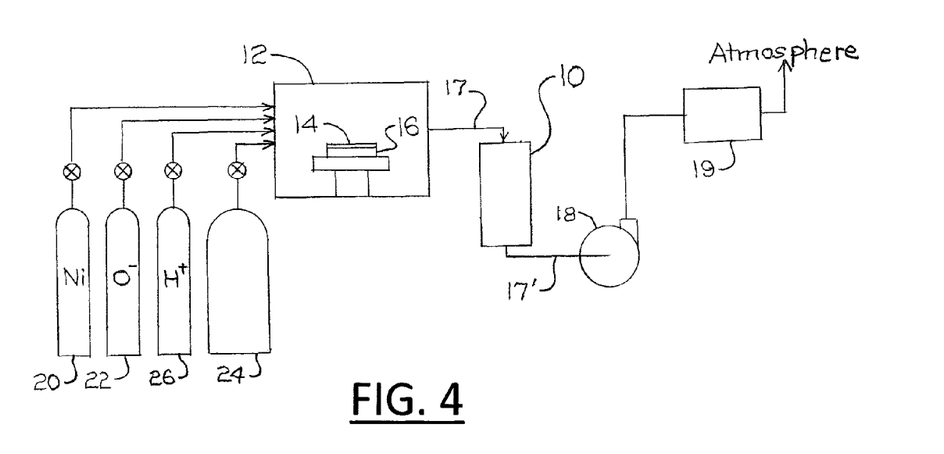
FIG. 4 is a simplified function block diagram of an example nickel deposition chamber equipped with the example high-efficiency, hot trap of FIG. 1.

In a typical example, but not the only, atomic layer deposition (ALD) process of depositing a thin film 14 of elemental nickel or nickel compound, for example, a nickel silicide, the reaction chamber is evacuated and maintained at a desired deposition pressure by a vacuum pump 18 via a foreline 17, 17', and a precursor gas containing Ni atoms, for example, an organometallic feed gas comprising bis (cylcopentadienyl)-nickel $(C_5H_5)_2Ni$, is flowed into a reaction chamber, such as the reaction chamber 12 depicted diagrammatically in FIG. 4, from precursor source represented by the precursor source container 20, along with an oxidizing agent, for example, water vapor 22, to produce an atomic layer of nickel oxide on the substrate 16. The reaction chamber 12 is then purged of the oxidation reaction by-products and any unreacted nickel precursor and oxidizing agent, for example, by an inert purge gas, such as argon from a purge gas source represented in FIG. 4 by the source container 24. Then the nickel oxide atomic layer on the substrate 16 is reduced by a reducing agent 26, for example, a hydrogen radical to reduce the nickel oxide atomic layer to elemental nickel, or, for example, by a silicon-containing precursor gas to reduce the nickel oxide atomic layer to nickel silicide. The reducing reaction by-products and any unreacted reducing agent is then purged from the reaction chamber by the inert purge gas 24, and the above-described sequence is repeated over and over again until a thin film 14 of elemental nickel or nickel compound of a desired thickness is deposited on the substrate 16.

Again, this example ALD process is described for an example context and not to be limiting. Other example nickel precursors include, but are not limited to, other organometallic feed gases, such as nickel acetate $Ni(CH_3.COO)_2$, nickel carbonyl $Ni(CO)_4$, bis(ethylcyclopentadieny)nickel $[(C_2H_5)C_5H_4]_2Ni$, bis(pentamethylclopentadienyl)nickel

[(CH$_3$)$_5$C$_5$]$_2$Ni, bis(i-propylcyclopentadienyl)nickel [(C$_3$H$_7$)C$_5$H$_4$]$_2$Ni, and bis(2,2,6,6-tetramethyl-3,5-heptanedionato) nickel Ni(C$_{11}$H$_{19}$O$_2$)$_2$. The elemental nickel bound in the resulting thin film 14 is not harmful, but fine nickel particles, which are also by-products of the reactions, and nickel ions bound loosely in the organometallic precursor gases in air or water, are pollutants and are toxic to humans and animals. The fine nickel particles in the foreline 17 that also result from the reactions in the reaction chamber 12 are also damaging to the vacuum pump 18 and cause pre-mature wear and failure. Therefore, the trap 10 is placed in the foreline 17 between the reaction chamber 12 and the vacuum pump 18 to remove as much nickel as commercially feasible from the effluent gas flowing in the foreline 17 before it reaches the vacuum pump 18. Therefore, the vacuum pump 18 can be protected from damage from the nickel particles and from deposition of nickel on the inner surface of the vacuum pump 18 due to chemical reaction or thermal dissociation of the precursor in the effluent in the hot trap 10. Also, the amount of Ni particles in the by-product discharged from the scrubber 19, which is typically installed in this kind of deposition system to remove reaction by-products from the effluent stream before discharge into the atmosphere, can be reduced or eliminated by including the hot trap 10 in the system. The hot trap 10 may even make it possible to eliminate the scrubber 19 in some systems. The example high-efficiency hot trap 10 can also be used to remove nickel or other metals or compounds from metalorganic chemical vapor deposition (MOCVD) or other CVD effluents.

Figure 11:
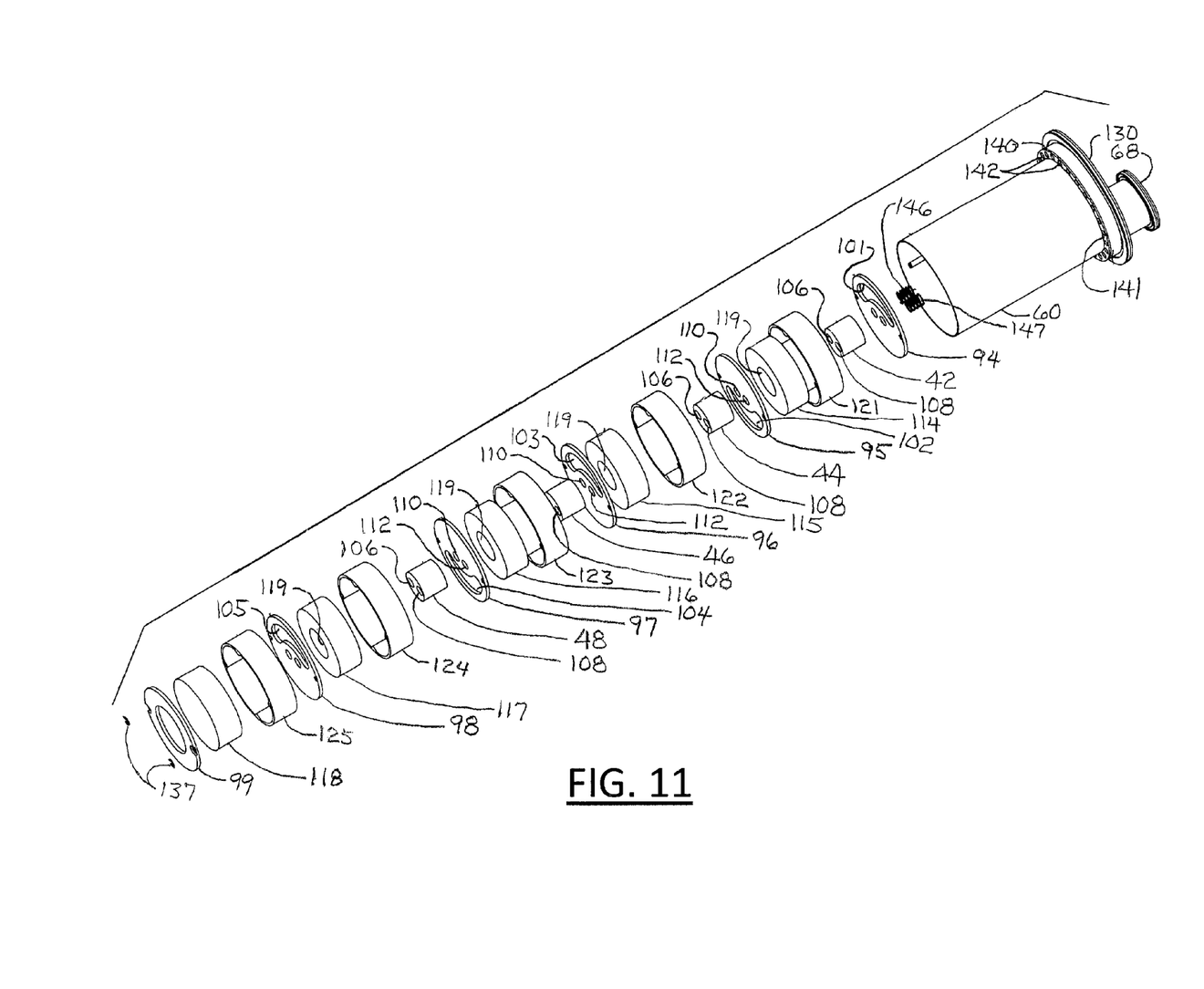
FIG. 11 is an exploded assembly view of the components of the example high-efficiency, hot trap.

The components, functional features, and operation of the example high-efficiency, hot trap 10 will be described in more detail below, particularly in reference to the cross-section views in FIGS. 5-10 and the exploded view in FIG. 11, but with the understanding that these drawings and descriptions are intended to be examples, not limitations, of the invention. Instead, the scope and limits of the invention are set forth in the claims below.

Figure 5:
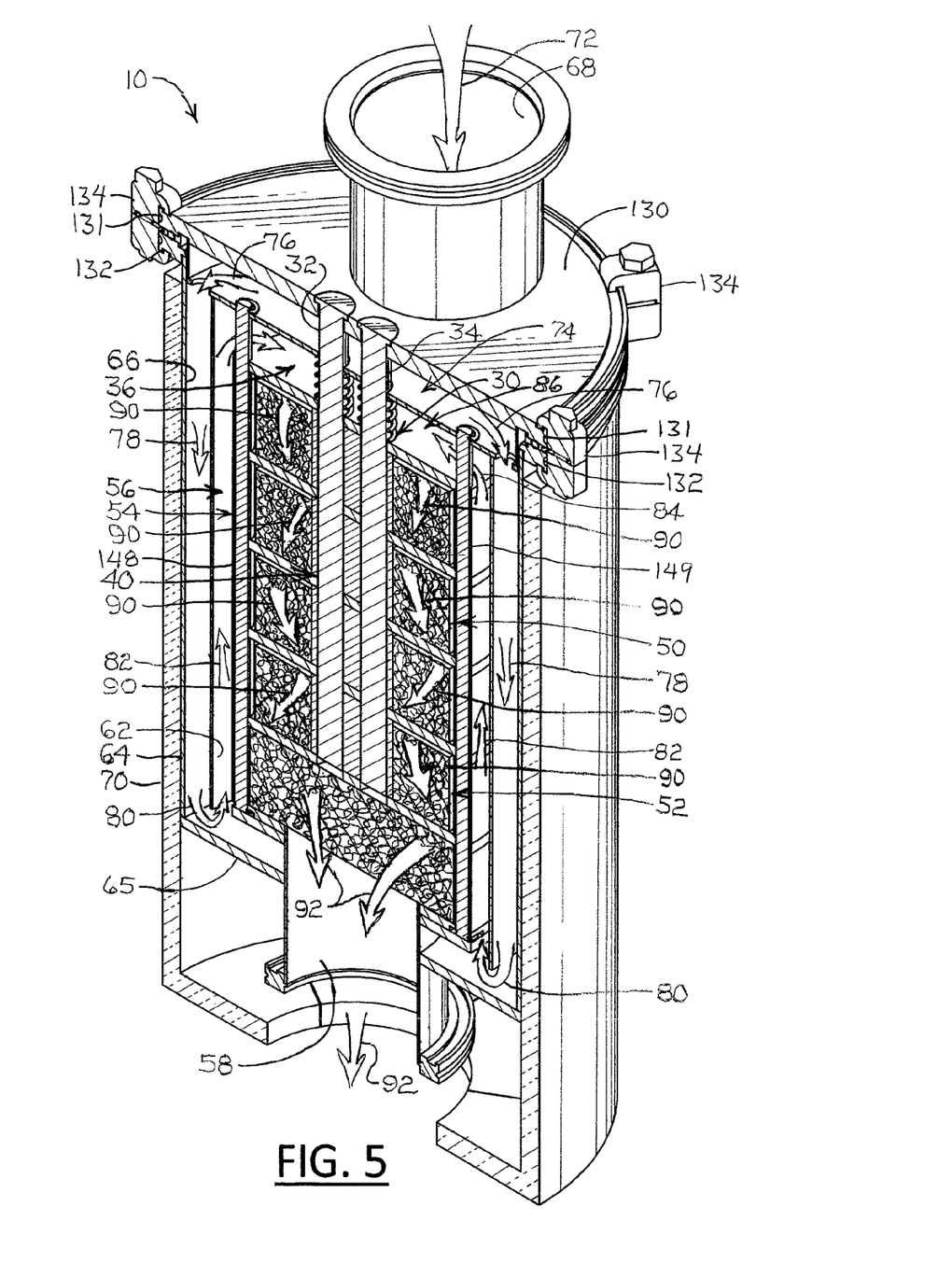
FIG. 5 is an isometric cross-section view of the example high-efficiency, hot trap taken along section line 5,7-5,7 in FIG. 3.
Figure 6:
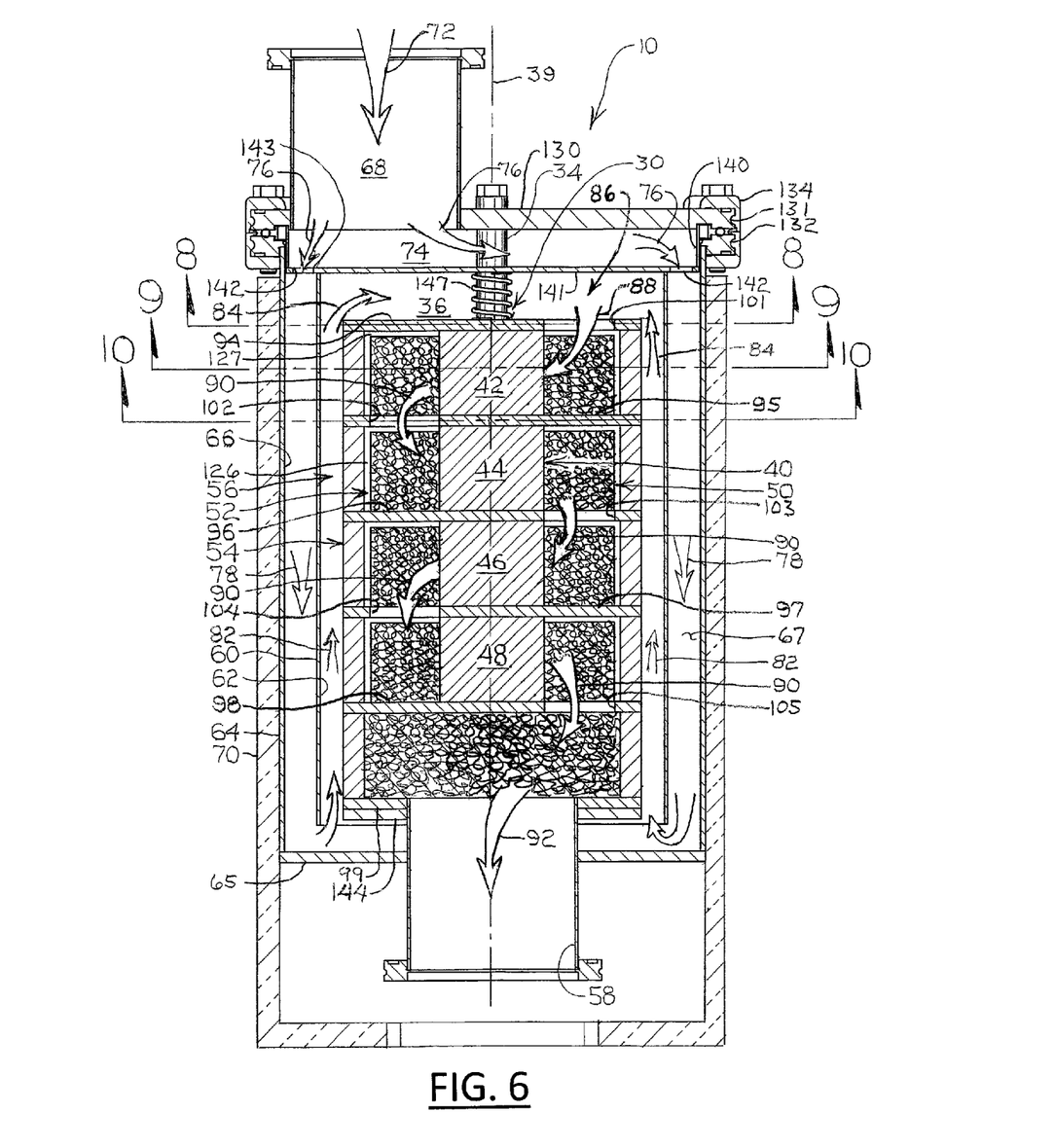
FIG. 6 is an elevation cross-section view of the example high-efficiency, hot trap taken along section line 6-6 in FIG. 3.
Figure 7:
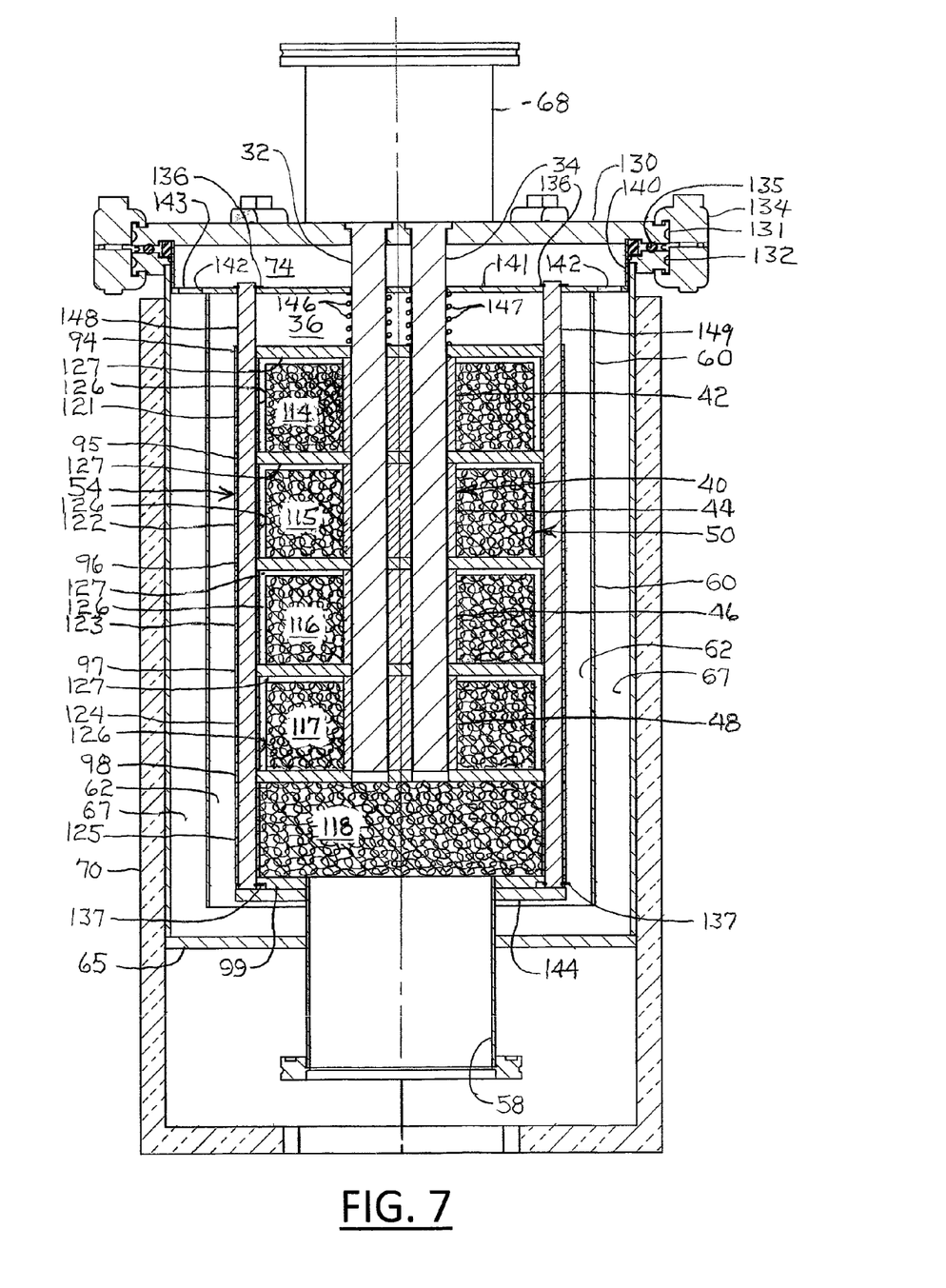
FIG. 7 is an elevation cross-section view of the example high-efficiency, hot trap taken along section line 5,7-5,7 in FIG. 3.
Figure 8:
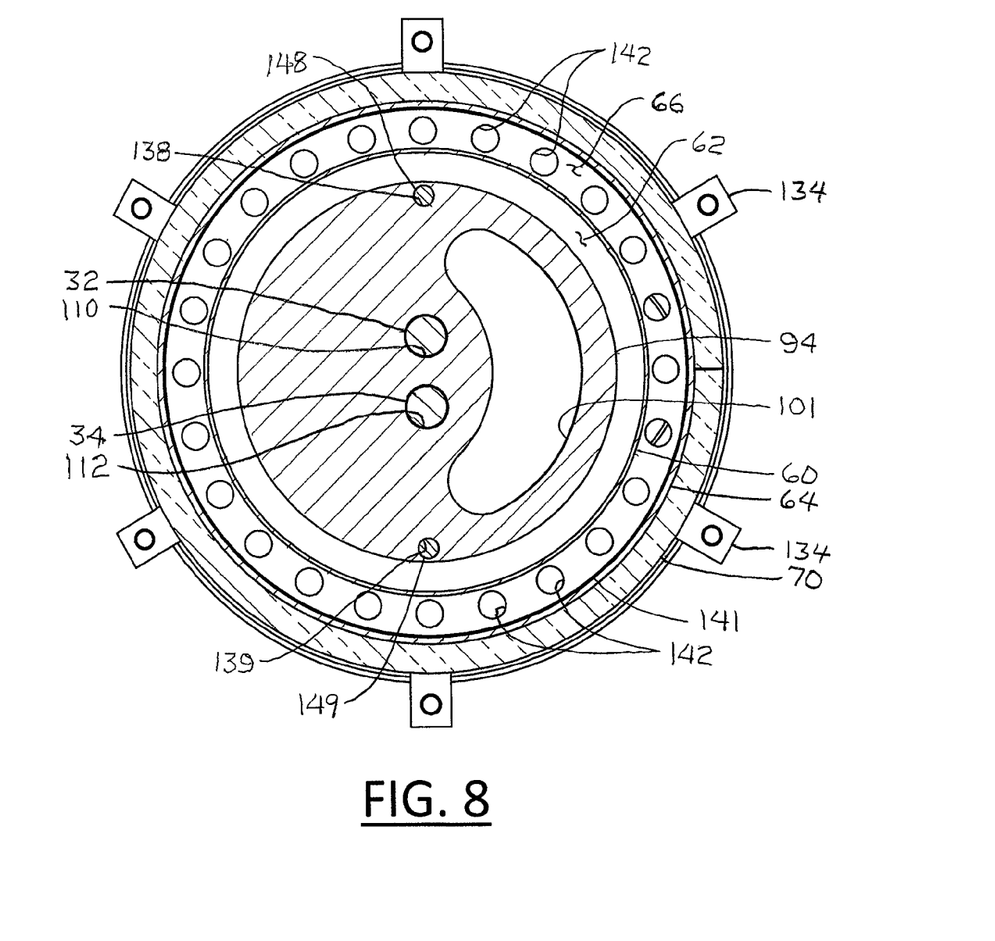
FIG. 8 is a cross-section view of the example high-efficiency, hot trap taken along Section line 8-8 in FIG. 6.

As best seen in FIGS. 5-7, a trap core comprising a heater assembly 30 and a trap medium 50 extends longitudinally through the central portion of a trap chamber 36, which is enclosed by a trap housing 38. The trap housing 38 in the example trap 10 is shown as being cylindrical, but other shapes could be used to enclose a suitable trap chamber 36 that can contain components for providing the functionalities described below. The principal functions of the example trap 10 occur in the trap core of the inner portion 52 of the trap chamber 36, including heating the trap medium 50 to very high temperatures, for example, in the range of 400 to 450° C., and maintaining such temperatures in the trap medium 50 as the effluent gas flows through the trap medium 50 so that chemical reactions or thermal dissociation of the precursor gas separates or releases the nickel or other metal in the precursor to deposit on the microsurfaces of the trap medium 50. An annular pre-heating duct 67 and an annular counter-flow heating duct 62, both surrounding the trap core, route the inflowing effluent gases in a manner that causes the inflowing effluent gases to interrupt radially outflowing heat from the trap core by absorbing at least some of the radially outflowing heat, which thereby heats the inflowing effluent gases. The heated inflowing effluent gases then carry the absorbed heat back toward and into the inner portion 52 of the trap chamber 36 as the heated inflowing effluent gases continue flowing toward and into the inner portion 52.

In this example, the heater assembly 30 includes one or more heater rods 32, 34 extending through a heat distribution column 40, which is aligned along the longitudinal axis 39 of the cylindrical housing 38 and trap chamber 36. The heat distribution column 40 is made of a heat conductive material, e.g., aluminum, with a high coefficient of heat transfer to distribute heat created by the heating rods 32, 34 radially outward from the center of the trap chamber 36 into the immediately surrounding, inner portion 52, of the trap chamber 36. The trap chamber 36 contains a trap medium 50, which surrounds the heat distribution column 40. The trap medium 50 comprises a material that is permeable, yet presents a tangle or labyrinth of micro-surfaces, to gaseous flow through the inner portion 52 of the trap chamber 36. The tangle or labyrinth of micro-surfaces can be provided by, for example, a mesh, woven wire, or multiple layers of screen, on which surface reactions can take place and in which particles can be trapped. Such mesh, woven wire, or screen can be made of, for example, stainless steel, or any other material that can provide large surface area for assisting surface chemical reaction, and at the same time, can withstand high temperature.

The inner portion 52 of the trap chamber 36, including the trap core, is enclosed around its periphery by an inner cylindrical wall 54, while its upper (inflow) end is in fluid flow communication with an intermediate portion 56 of the trap chamber 36 and its lower (outflow) end is in fluid flow communication with an outlet conduit 58. The intermediate portion 56 of the trap chamber 36 around the inner cylindrical wall 54 is enclosed by an intermediate cylindrical wall 60 extending concentrically around, a spaced distance radially outwardly from, the inner cylindrical wall 54 to provide an annular counterflow duct 62 around the inner cylindrical wall 54. An outer cylindrical wall 64, which can be part of the trap housing 38, is spaced a radial distance outwardly from the intermediate cylindrical wall 60 to enclose an outer portion 66 of the trap chamber 36 and forms an annular pre-heating duct 67 between the cylindrical intermediate wall 60 and the cylindrical outer wall 64, which is in fluid-flow communication with an inlet conduit 68 adjacent to its upper (inlet) end and in fluid-flow communication with the annular counterflow duct 62 of the intermediate portion 56 of the trap chamber 36. Therefore, heat from the heater assembly 30 in the trap core is transmitted by radiation, conduction, and convection radially outward from the heater assembly 30, through the inner portion 52 including the trap medium 50, through the intermediate portion 56, and through the outer portion 66 of the trap chamber 36 to the outer wall 64. An optional thermal insulation jacket 70 can be positioned on the exterior surface of the outer wall 64 to help retain heat in the trap chamber 36 and to keep the temperature on the outside of the trap 10 from becoming dangerously high in order to minimize danger of injury to persons who might come into contact with the trap 10.

The structure and pattern of trap 10 provides efficient conservation and use of heat generated by the heating assembly 30 to drive a chemical reaction or thermal dissociation of the nickel containing precursor to remove the nickel from the nickel precursors in a gas stream flowing through the trap 10 and minimizes temperature on the outside of the trap 10 by using the in-flowing effluent to inhibit radial heat flow to the outer wall 64 and to carry the heat back into the inner portion 52 of the trap chamber 36, where the returned heat combines with heat produced by the heater assembly 30 to drive reactions or thermal dissociations that free the nickel atoms from the precursor gas to deposit on the micro-surfaces of the trap medium 50. Referring primarily to FIGS. 5 and 6, the effluent gas laden with nickel precursor gas from a foreline 19 (FIG. 4) enters the hot trap 10 through the inlet conduit 68, as indicated by the flow arrow 72 in FIGS. 5 and 6. The outlet conduit 58 is connected to the vacuum pump 18 via the remainder of the foreline 17' (FIG. 4), so the vacuum pump 18 draws the effluent through the hot trap 10 as described below. From the inlet conduit 68, the effluent gas flows through a flow distributor subchamber portion 74 of the trap chamber 36 into the pre-heating duct 67 of the annular outer portion 66 of the trap chamber 36, as indicated by the flow arrows 76. A gas distribution ring 143, which can be a separate component, but in this example is provided by a radial extension of a divider plate 141 having a plurality of holes 142 dispersed around the ring 143, distributes the inflowing effluent gases more or less evenly into the entrance of the annular pre-heating duct 67. As the effluent gas flows downwardly through the annular outer portion 66 of the trap chamber 36, as indicated by the flow arrows 78, the effluent gas picks up heat flowing radially outward from the heating assembly 30 in the axial center of the trap chamber 36 that has reached the annular outer portion of the trap chamber 36. The somewhat heated effluent gas flow continues downwardly through the annular pre-heating duct 67 of the outer portion 66 of the trap chamber 36 to the bottom of the trap housing 38, where it makes a turn, as indicated by flow arrows 80, into the bottom of the annular counterflow duct 62 of the intermediate portion 56 of the trap chamber 36, thus carrying the heat that it acquired in the annular outer portion 66 back toward the center of the trap chamber 36, thereby preventing that heat from reaching and flowing outwardly through the outer cylindrical wall 64. As the effluent gas flow continues to flow upwardly through the annular counterflow duct 62, as indicated by flow arrows 82, it picks up more of the heat that has flowed radially outward from the heat assembly 30 to the annular counterflow duct 62, thereby leaving less heat to flow farther outward to the annular outer portion 66 of the trap chamber 36. From the annular counterflow duct 62, the effluent gas flow continues as indicated by flow arrows 84, through a header portion 86 of the intermediate chamber portion 56 and then into the inner portion 52, as indicated by flow arrow 88 (FIG. 6), thus carrying the heat absorbed by the effluent gas from the annular outer portion 66 and from the intermediate portion 56 back into the inner portion 52 of the trap chamber 36. In the inner portion 52 of the trap chamber 36, the already pre-heated effluent flows into and through the hot trap medium 40, as indicated by the flow arrows 90, where the effluent gas is heated to a high enough temperature to ensure reactions or dissociation of the nickel laden precursor gas to release the nickel from the precursor to deposit on the microsurfaces of the trap medium 40. After the effluent has flowed through the trap medium 50 and most, if not all, of the nickel has been deposited in the trap medium 50, the remainder of the effluent flows to and out of the outlet conduit 58, as indicated by the flow arrows 92.

One or more baffle plates 94, 95, 96, 97, 98 can be used to force the effluent flow to travel in a tortuous path through the trap medium 50, as shown in FIG. 6. In the example shown in FIG. 6, the baffle plates 94, 95, 96, 97, 98 have apertures 101, 102, 103, 104, 105, respectively, that are axially misaligned with apertures in adjacent baffle plates so that the effluent flow is forced to flow laterally as well as longitudinally in the trap medium 50 to achieve a more thorough distribution of the flow in the trap medium 50 and a longer dwell time of the effluent in the trap medium 50. In the example trap 10 illustrated in FIGS. 5-7, the uppermost baffle plate 94 also serves as an extension of the intermediate wall 60 that separates the inner portion 52 of the trap chamber 36 from the intermediate portion 56.

The heat insulating jacket 70 on the outside of the outer cylindrical wall 64 inhibits heat conduction from the annular outer portion 66 through the outer wall 64 to the exterior of the trap 10, thus causing more heat absorption by the effluent fluid flowing through the annular pre-heating duct 67 and minimizing the temperature of the outside of the trap 10. Therefore, the hot trap 10 can be operated with very high temperatures in the inner portion 52 of the trap chamber— high enough for efficient thermal dissociation of the precursor gas in the trap medium 50, yet not have a dangerously high temperature on the outside of the trap. This structure and thermal management attains superior trapping efficiency. A prototype has achieved removal of ninety-three percent (93%) of the nickel in the effluent gas flowing into the example trap 10 while consuming as little as half as much power as other commercially available traps used for removing nickel from ALD and MOCVD effluents. Even greater nickel removal efficiencies at or near one hundred percent (100%) nickel removal is anticipated with farther refinements in sizing, residence time, and heat parameters for particular effluent flows, e.g., about fifteen (15) standard liters per minute at sixteen degrees centigrade (16° C.).

The salient features and configurations of the hot trap 10 discussed above can be achieved in a number ways, one of which is illustrated in the example components and assemblages illustrated in FIGS. 5-11. For example, the heat distribution column 40 of the heater assembly 30 can comprise a plurality of cylindrical heat distribution blocks 43, 44, 46, 48 stacked longitudinally on the baffle plates 95, 96, 97, 98, respectively, with each heat distribution block 43, 44, 46, 48 having two holes 106, 108 axially aligned with corresponding holes 106, 108 in the adjacent heat distribution blocks 43, 44, 46, 48, respectively, to accommodate the heater rods 32, 34 that are inserted through those hole 106, 108. Each baffle plate 94, 95, 96, 97, 98 also has a pair of holes 110, 112 axially aligned with the holes 106, 108 to accommodate insertion of the heater rods 32, 34 as well.

Figure 9:
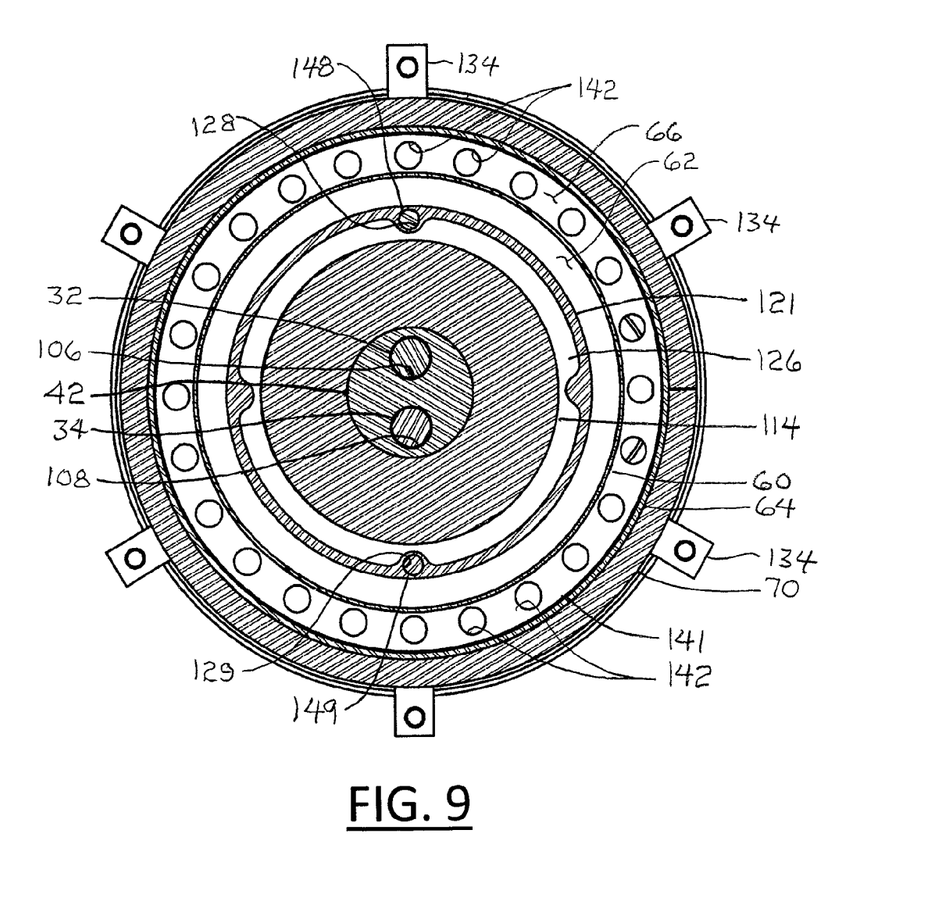
FIG. 9 is a cross-section view of the example high-efficiency, hot trap taken along Section line 9-9 in FIG. 6.
Figure 10:
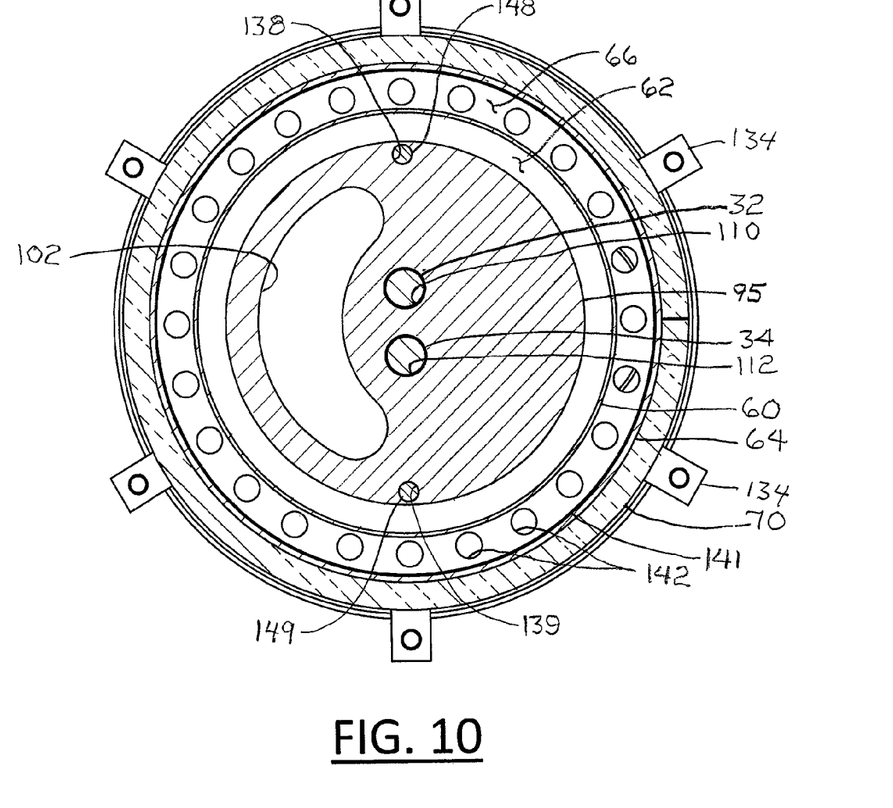
FIG. 10 is a cross-section view of the example high-efficiency, hot trap taken along Section line 10-10 in FIG. 6.

The trap medium 50 can be comprised of a plurality of mesh or woven wire biscuits, for example, the woven wire biscuits 114, 115, 116, 117, 118. In the example trap 10, the top four trap medium biscuits 114, 115, 116, 117 each have an axial hole 119 to accommodate the respective heater distribution blocks 42, 44, 46, 48. The cylindrical inner wall 54 that encloses the inner portion 52 of the trap chamber 36 can be comprised of a plurality of rings 121, 122, 123, 124, 125 positioned between the peripheral edges of the baffle plates 104, 105, 106, 107, 108, and of a bottom plate 99, respectively. The top four trap medium biscuits 114, 115, 116, 117 in the example trap 10 are shown to be slightly smaller in size than the respective spaces enclosed by the rings 121, 122, 123, 124 and baffle plates 94, 95, 96, 97, 98, thereby leaving small, unfilled spaces 126, 127 around the peripheral edges and tops, respectively, of the trap medium biscuits 114, 115, 116, 117, as best seen in FIGS. 6, 7, and 9. These unfilled spaces 126, 127 allow the effluent gas flow to distribute itself more or less uniformly around and through those four trap medium biscuits 114, 115, 116, 117.

The trap housing 38 can be structured and assembled in a conventional manner, for example, in the form of a can enclosed by the outer cylindrical wall 64 and a bottom end plate 65, leaving an openable top end for insertion of the internal components. The top end can be closed and sealed by a cover 130 with a peripheral flange 131 that can be clamped to a mating peripheral flange 132 around the top edge of the outer cylindrical wall 64 by a plurality of clamps 134. An O-ring seal 135 seals the cover 130 to the rest of the housing 38. The inlet conduit 68 extends upwardly from the cover 130.

The distribution subchamber portion 74 of the trap chamber 36 is separated from the rest of the trap chamber 36 by a dish-shaped insert 140 at the top end of the trap chamber 36. The bottom plate 141 of the insert 140 serves as an intermediate divider plate and, as explained above, has a plurality of holes 142 adjacent its peripheral edge for distributing effluent flow from the inlet conduit 68 more or less uniformly into the annular pre-heating duct 67 in the outer portion 68 of the trap chamber 36 between the outer cylindrical wall 64 and the intermediate cylindrical wall 60, as explained above and illustrated by the flow arrows 76 in FIGS. 5 and 6. The intermediate cylindrical wall 62 is attached to and extends downwardly from the bottom plate 141 concentric with the longitudinal axis 39 and inner cylindrical wall 54.

The outlet conduit 58 is attached to and extends downwardly from the bottom end plate 65 of the housing 38 and upwardly to a support plate 144 that supports the bottom end plate 99 that encloses the bottom end of the inner portion 52 of the trap chamber 36, as well as the assembly comprising the rings 121, 122, 123, 124, 125, baffle plates 94, 95, 96, 97, 98, and the trap medium biscuits 114, 115, 116, 117, 118, all of which are held together by a pair of rods 148, 149. Each of the baffle plates 94, 95, 96, 97, 98 and the end plate 99 has diametrically opposite holes 138, 139 through which the rods 148, 149 extend, and each of the rings 121, 122, 123, 124, 125 has diametrically opposite holes 128, 129 through which the rods 148, 149 also extend. The ends of each rod 148, 149 are grooved to accept C-clips 136, 137, which retain the bottom baffle plate 99 at a fixed distance from the bottom plate 141 of the insert 140. A pair of springs 146, 147 around the heater rods 32, 34 between the top baffle plate 94 and the bottom plate 141 of the insert 140 maintain the spatial relation between those components and the snug assembly of the baffle plates 94, 95, 96, 97, 98, 99 with the rings 121, 122, 123, 124, 125.

An example operating temperature distribution of the example hot trap 10 described above includes the following: (i) 415° C. located in the top mesh trap medium biscuit 114 adjacent the top temperature distribution block 42; (ii) 443° C. located in the middle mesh trap medium biscuit 116 midway between the temperature distribution block 46 and the enclosure ring 123; (iii) 400° C. located on the outside of the middle enclosure ring 123; (iv) 291° C. located in the non-heated bottom mesh trap medium biscuit 118; (v) 122° C. located on outside surface of the outer cylindrical wall 64, inside the insulation 70, about midway between the top and the bottom of the outer cylindrical wall 64; and (vi) 90° C. on the outside surface of the insulation 70. This example temperature profile illustrates the effectiveness of the structure of the example hot trap 10 for maintaining very high temperatures in the trap medium components in the inner portion 52 of the trap chamber 36 while keeping a large portion of the heat inside the trap chamber 36 and inhibiting heat loss due to radiation transfer of heat to the outer cylindrical wall 64, as explained above. The heater assembly 30 with the heater rods 32, 34 and heat distribution column 40 are positioned along the center, longitudinal axis 39 of the trap chamber 36 surrounded immediately by the trap medium 50 contained within the inner cylindrical wall 54, where the temperature is high— at least 400° C. (e.g., in the range of 400 to 450° C.) to drive the reaction, e.g., thermal dissociation, of the nickel-containing precursor gas in the trap medium 50. The head naturally tends to radiate and conduct radially outwardly, toward the outside of the trap housing 38, but it is absorbed by the inflowing effluent in the annular outer portion 66 of the trap chamber 36 and in the annualar counterflow portion 62 of the trap chamber 36, which serves the dual function of pre-heating the inflowing effluent and carrying the heat back into the inner portion 52 in the middle of the trap chamber. This action also minimizes the heat that reaches the outer cylindrical wall, so the temperature at the outer cylindrical wall 64 is kept relatively low in comparison to the temperature inside the inner portion 52 of the trap chamber 36. The insulation jacket 70 further inhibits heat flow to the outside of the trap 10 and maintains the outside temperature of the trap 10 at a safer level. Such thermal management and heat conservation contributes to an overall increase in trapping efficiency with a lower power requirement than other traps used for similar purposes.

The foregoing description provides examples that illustrate the principles of the invention, which is defined by the features that follow. Since numerous insignificant modifications and changes will readily occur to those skilled in the art once they understand the invention, it is not desired to limit the invention to the exact example constructions and processes shown and described above. Accordingly, resort may be made to all suitable combinations, subcombinations, modifications, and equivalents that fall within the scope of the invention as defined by the features. The words "comprise," "comprises," "comprising," "include," "including," and "includes" when used in this specification, including the features, are intended to specify the presence of stated features, integers, components, or steps, but they do not preclude the presence or addition of one or more other features, integers, components, steps, or groups thereof. The terms upper, upwardly, lower, bottom, top, down, downwardly, vertical, horizontal, and other directional terms in this description are in reference to the diagrammatic orientations depicted in the drawings and are only used for convenience and clarity in this description unless otherwise indicated. They are not intended to limit the trap 10 to any particular orientation in real use applications, and, in fact, the trap 10 can be positioned and used in any desired orientation. Also, while the description was directed to trapping nickel from nickel-containing precursor gas for convenience, the trap 10 can also be used for trapping and removing other materials from effluent gas flow streams.

The invention in which an exclusive property or privilege is claimed is defined as follows:

1. Trap apparatus, comprising:
    a housing enclosing a trap chamber between an inlet conduit and an outlet conduit;
    a trap core comprising a heater assembly positioned in a center portion of the trap chamber and a trap medium in an inner portion of the trap chamber surrounding the heater assembly;
    a trap medium positioned in the inner portion of the trap chamber around the heater assembly;
    an inner wall around the inner portion of the trap chamber separating the inner portion of the trap chamber from an intermediate portion of the trap chamber, which surrounds the inner portion of the trap chamber;
    an intermediate wall around the intermediate portion of the trap chamber and spaced radially outwardly from the inner wall, thereby separating the intermediate portion of the trap chamber from an outer portion of the trap chamber and enclosing an annular counterflow heating duct between the inner wall and the intermediate wall;
    an outer wall around the outer portion of the trap chamber and spaced radially outward from the intermediate wall and enclosing a pre-heating duct between the intermediate wall and the outer wall, wherein the inlet conduit is connected in fluid-flow relation to an upper end of the pre-heating duct, a lower end of the pre-heating duct is connected in fluid-flow relation to a lower end of the counter-flow heating duct, an upper end of the counter-flow heating duct is connected in fluid-flow relation to an upper end of the inner portion of the trap chamber, and a lower end of the inner portion of the trap chamber is connected in fluid-flow relation to the outlet conduit.

2. The trap apparatus of claim 1, wherein the outer wall comprises part of the housing, and the housing also includes: (i) a bottom end plate connected to the lower end of the outer wall and extending radially inwardly a spaced distance below the intermediate wall to the outlet conduit to enclose the bottom end of the outer portion of the trap chamber in a manner that leaves the lower end of the pre-heating duct in fluid communication with the lower end of the counter-flow heating duct; and (2) a cover plate mounted on the upper end of the outer wall enclosing an upper end of the trap chamber.

3. The trap apparatus of claim 2, wherein the inlet conduit opens into the trap chamber through the cover plate.

4. The trap apparatus of claim 3, including an insert mounted in the upper end of the outer wall with an intermediate divider plate mounted on and closing the upper end of the intermediate wall a spaced distance under the cover plate in a manner that separates the outer portion of the trap chamber from the intermediate portion of the trap chamber.

5. The trap apparatus of claim 4, including a fluid-flow distribution ring positioned adjacent the upper end of the outer wall at the entrance of the annular pre-heating duct.

6. The trap apparatus of claim 5, wherein the fluid-flow distribution ring comprises a radial extension of the intermediate divider plate over the entrance of the annular pre-heating duct, said radial extension of the intermediate divider plate having a plurality of holes distributed around the entrance of the pre-heating duct such that the fluid-flow connection of the inlet conduit to the annular pre-heating duct is via the plurality of holes in the radial extension of the intermediate divider plate that comprises the fluid-flow distribution ring.

7. The trap apparatus of claim 6, wherein the trap core includes a plurality of baffle plates spaced apart from each other longitudinally with the trap medium positioned between the baffle plates.

8. The trap apparatus of claim 7, wherein each baffle plate has an aperture to accommodate fluid flow from one side of the baffle plate to the other side.

9. The trap apparatus of claim 8, wherein the apertures of respectively adjacent baffle plates are not axially aligned with each other.

10. The trap apparatus of claim 1, wherein the heater assembly includes at least one heater rod surrounded by a heat distribution column.

11. The trap apparatus of claim 10, wherein the heat distribution column comprises a heat conducting metal.

12. The trap apparatus of claim 11, wherein the heat distribution column comprises a plurality of heat conducting metal blocks arranged in axial alignment with each other along a longitudinal axis of the trap chamber.

13. The trap apparatus of claim 1, including thermal insulation positioned around the periphery of the outer wall.

14. Trap apparatus for chemically reacting or thermally dissociating a metal-containing precursor in an effluent gas flow, comprising:
heater means extending longitudinally along an axis of an enclosed trap chamber for producing heat and transmitting the heat radially outward in relation to the axis into a trap medium which surrounds the heater means and comprises a material that is permeable to gas flow and has multiple micro-surfaces;
an annular counterflow heating duct positioned around the periphery of the trap medium and wherein the annular counterflow heating duct is separated from the trap medium by an annular inner wall;
an annular pre-heating duct positioned around the periphery of the annular counterflow heating duct and wherein the annular pre-heating duct is separated from the annular counteflow heating duct by an annular intermediate wall;
annular heat insulation means surrounding the annular pre-heating duct; and
means for directing a flow of effluent gas from the inlet in a longitudinal direction through the annular pre-heating duct, from the annular pre-heating duct in the opposite longitudinal direction through the counterflow heating duct, and from the counterflow heating duct through the trap medium to the outlet.

15. A method of trapping a metal component of an organometallic precursor in a flow of effluent gases, comprising:
flowing the effluent gases through an annular pre-heating duct in a trap that surrounds a heat source in the trap a radial distance outward from the heat source with an annular trap medium surrounding the heat source between the heat source and the annular pre-heating duct and an annular counterflow heating duct interposed between the annular trap medium and the annular pre-heating duct so that at least some heat transmitted radially outward from the heat source and through the annular trap medium and through the annular counterflow heating duct is absorbed by the effluent gases flowing through the annular pre-heating duct to pre-heat the effluent gases flowing through the annular pre-heating duct and to prevent at least some of the heat that is transmitted to the annular pre-heating duct from escaping the trap;
flowing the effluent gases from the pre-heating duct in a counterflow direction through the counterflow heating duct so that at least some of the heat transmitted radially outward from the heat source and through the annular trap medium is absorbed by the effluent gases flowing through the counterflow heating duct to further heat the effluent gases and to prevent at least some of the heat that is transmitted to the counterflow heating duct from being transmitted farther radially outward to the surrounding annular pre-heating duct;
flowing the heated effluent gases from the counterflow heating duct through the annular trap medium surrounding the heat source for further heating the effluent gases and chemically reacting or thermally dissociating the organometallic precursor in the effluent gases to release the metal for deposition on the multiple microsurfaces of the trap medium; and
flowing the effluent gases without the deposited metal from the trap medium to the outlet.

16. Trap apparatus for trapping a metal component of an organometallic precursor in a flow of effluent gases, comprising:
means for flowing the effluent gases through an annular pre-heating duct in a trap that surrounds a heat source in the trap a radial distance outward from the heat source with an annular trap medium surrounding the heat source between the heat source and the annular pre-heating duct and an annular counterflow heating duct interposed between the annular trap medium and the annular pre-heating duct so that at least some heat transmitted radially outward from the heat source and through the annular trap medium and through the annular counterflow heating duct is absorbed by the effluent gases flowing through the annular pre-heating duct to pre-heat the effluent gases flowing through the annular pre-heating duct and to prevent at least some of the heat that is transmitted to the annular pre-heating duct from escaping the trap;

means for flowing the effluent gases from the pre-heating duct in a counterflow direction through the counterflow heating duct so that at least some of the heat transmitted radially outward from the heat source and through the annular trap medium is absorbed by the effluent gases flowing through the counterflow heating duct to further heat the effluent gases and to prevent at least some of the heat that is transmitted to the counterflow heating duct from being transmitted farther radially outward to the surrounding annular pre-heating duct;

means for flowing the heated effluent gases from the counterflow heating duct through the annular trap medium surrounding the heat source for further heating the effluent gases and chemically reacting or thermally dissociating the organometallic precursor in the effluent gases to release the metal for deposition on the multiple microsurfaces of the trap medium; and means for flowing the effluent gases without the deposited metal from the trap medium to the outlet.

17. The trap apparatus of claim 16, including heat insulation surrounding the pre-heating duct for inhibiting radial flow of heat from the pre-heating duct to the exterior of the trap.

18. The trap apparatus of claim 16, including means for distributing flow of effluent gases from the inlet into the annular pre-heating duct.

\* \* \* \* \*